United States Patent Office 3,521,479
Patented July 21, 1970

3,521,479
THROTTLING CONVERSION METER
Don E. Carter, Creve Coeur, Mo., assignor to Monsanto
Company, St. Louis, Mo., a corporation of Delaware
Filed Apr. 6, 1967, Ser. No. 628,998
Int. Cl. G01n 25/00
U.S. Cl. 73—28                                    13 Claims

ABSTRACT OF THE DISCLOSURE

A device and method for measuring the degree of ethylene to polyethylene conversion by passing the mixture through an orifice under isenthalpic conditions and determining conversion from thermodynamic data as a function of upstream and downstream temperatures and pressures.

---

This invention relates in general to constant enthalpy conversion meters, and more particularly, to meters which are capable of measuring the degree of monomer to polymer conversion.

It is well recognized that there has been a long-standing need for an instrument to measure and monitor the conversion of monomer to polymer in polymer manufacturing plants, both in commercial scale and in pilot plant operations. In research and pilot operations, such a device would aid in developing quantitative relations between operating conditions and conversion, and thus make it possible to employ unsteady state experimental techniques. In commercial scale plant operations, a polymer conversion meter would enable more efficeint operation of the plant. A conversion meter of this type would apprize the operator of the plant of the degree of conversion being attained and whether or not the plant is operating at optimum productivity. Consequently, through the use of such a meter, the necessary adjustments could be made to insure optimum productivity.

In the manufacture of polyethylene, for example, it is extremely difficult, and oftentimes impossible to determine the degree of monomer conversion taking place within the reactor. Consequently, the operating conditions are often established by a trial and error process. Since the reactor is usually operated in a pressure range of approximately 35,000 lbs. per square inch pressure, the monomer, ethylene is a very dense gas. Moreover, the monomer at these pressure conditions acts as a solvent for the polymer and the polymer is, in effect, dissolved in the monomer. Consequently, devices which employ the principle of condensing one of the gases and measuring the volume or pressure change, are not applicable since the gases contained herein do not necessarily condense.

It is, therefore, the primary object of the present invention to provide a method for measuring the degree of monomer to polymer conversion in a polymer reactor.

It is another object of the present invention to provide an apparatus which is capable of monitoring monomer conversion in a polymer producing system.

It is an additional object of the present invention to provide a method of determining monomer-polymer conversion wherein a simple temperautre measurement will provide an indication of the degree of conversion.

It is a further object of the present invention to provide an apparatus of the type stated which is inexpensive to manufacture and can be used with a wide variety of monomer-polymer conversion systems.

It is also an object of the present invention to provide an apparatus of the type stated which is not subject to, or affected by external operating conditions and which is highly accurate in its operation.

With the above and other objects in view, my invention resides in the novel features of form, construction, arrangement, and combination of parts presently described and pointed out.

GENERAL DESCRIPTION

Figure 1:
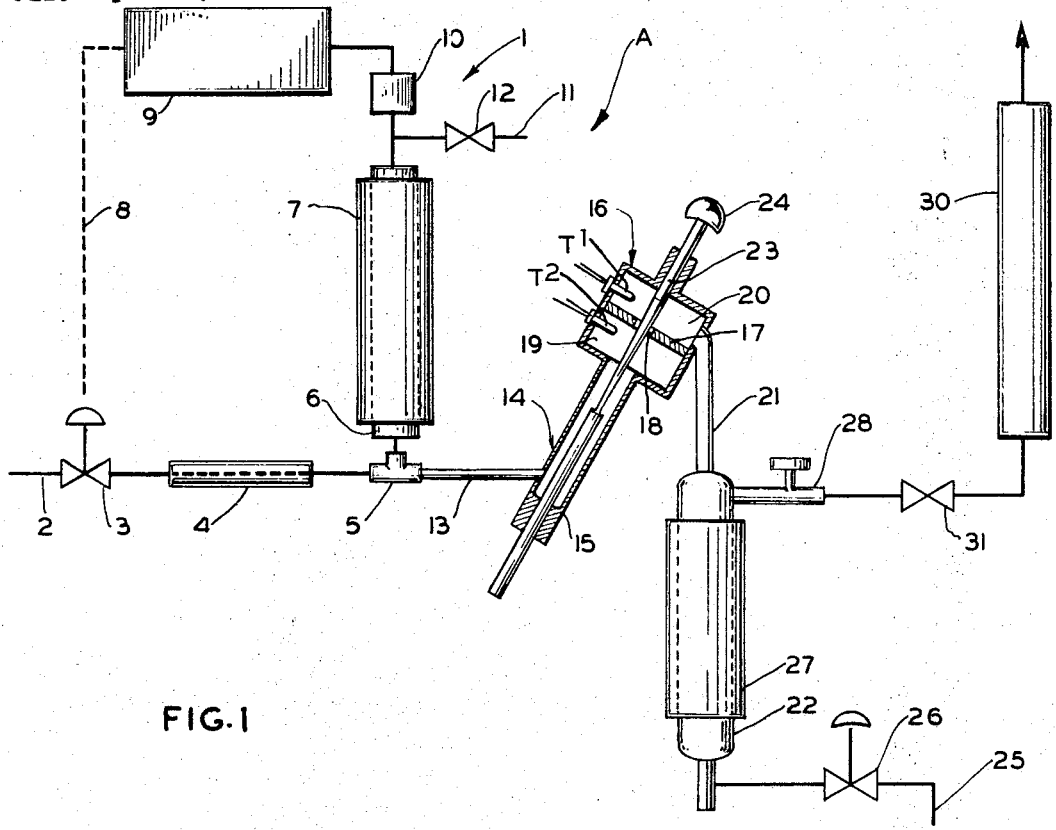
FIG. 1 is a schematic side elevational view, partially broken away and in section of a conversion meter constructed in accordance with and embodying the present invention.

Generally speaking, the throttling calorimeter of the present invention operates on a principle that the temperature change of a monomer-polymer system with a change in pressure under approximately isenthalpic conditions is related to the relative concentration of monomer and polymer in the system. The effluent from the polymer reactor containing both the polymer and monomer is passed into the throttling calorimeter of the present invention and is adjusted to a selected upstream temperature and pressure. The monomer-containing polymer is then passed through a throttle valve or orifice into a region of lower pressure. On the downstream side, the gaseous monomer with the polymer contained therein will suffer an approximately adiabatic expansion which creates a change in the temperature of the mixture on the downstream side. By determining the temperature differential at the selected pressure differential, the amount of polymer present in the effluent of the reactor can be determined from a thermodynamic conversion chart of the type illustrated in FIG. 2.

The device and method of the present invention are particularly useful in ethylene-polyehtylene systems, where the ethylene is converted to polyethylene under high pressure and temperature. In this particular situation, the ethylene exists as a non-ideal gas, and in the reactor is maintained at approximately 35,000 p.s.i. pressure. When the ethylene monomer is converted to the polyethylene polymer, the latter becomes a solid material. However, at this pressure, the ethylene acts as a solvent for the polyethylene and the polyethylene is, in effect, dissolved in the ethylene from which it is converted.

DETAILED DESCRIPTION

Referring now in more detail and by reference characters to the drawings which illustrate a preferred embodiment of the present invention, A designates a throttling conversion meter or so-called "throttling calorimeter" which serves as a conversion meter. The conversion meter A is designed to measure the conversion of gaseous ethylene to polyethylene in a high pressure polyethylene reactor, in a manner somewhat similar to the device described in my copending application, Ser. No. 318,647, filed Oct. 24, 1963, now U.S. Pat. No. 3,310,975, and relating to a constant volume conversion meter. In the constant volume conversion meter of the aforementioned copending application, the temperature of the constituents are reduced and the pressure reduction is noted in a constant volume condition and by determining the pressure differential at selected temperatures, the percent of conversion can be determined. In essence, the throttling calorimeter of the present invention is based on the principle that if a mixture of polyethylene and ethylene at some fixed temperature and pressure is expanded through an orifice to some fixed lower pressure, the downstream temperature of the mixture will depend on the portions of polymer and monomer present.

The throttling calorimeter of the present invention generally comprises a preconditioning system 1 which includes a high pressure inlet line 2 connected to an automatic control valve 3. The control valve 3 is connected on its downstream side to a heat exchanger 4 which is designed to heat the mixture in the high pressure inlet line 2 to a desired temperature. The high pressure inlet line 2 is in turn connected to the effluent side of a polyethylene reactor (not shown). The downstream side of the heat exchanger 4 is connected to a T-shaped pipe fitting 5, the vertical leg of which is connected to a surge tank 6 in the manner as illustrated in FIG. 1. Disposed about the surge tank 6 is a conventional heater 7.

Connected across the control valve 3 and the upper end of the surge tank 6 is a feedback control loop 8 which includes a conventional pressure controller 9 and a conventional pressure transducer 10, all in the manner as illustrated in FIG. 1. The ethylene monomer which contains polyethylene from the reactor is generally at a rather high pressure and high temperature condition and it is, therefore, in a pressure-temperature state which is not desirable for measuring monomer-polymer conversion. The preconditioning system 1 of the present invention is designed to reduce the inlet gas which is approximately at a pressure of 35,000 p.s.i. to a reduced pressure of approximately 8,000 p.s.i. In order to maintain a constant pressure at the T-shaped fitting 5, the feedback 8 is provided. The pressure transducer 10 will sense the variations in the pressure in the surge tank 6 from the desired set level and cause the pressure controller 9 to actuate the valve 3 in order to maintain a relatively constant pressure on the downstream side of the valve 3. The surge tank 6 is provided to substantially dampen any undesirable fluctuations in the pressure at the T-shaped fitting 5. The surge tank 6 would contain a quantity of ethylene gas at its upper end.

The pressure transducer 10 is not heated and operates at a temperature lower than the temperature in the surge tank 6. The transducer 10 does not operate efficiently at the temperatures maintained in the ethylene-polymer mixture and temperature reduction therefore is desirable. However, at lower temperatures, the polymer would precipitate from the ethylene-polymer solution and would interfere with operation of the pressure transducer 10. This problem is met by filling the upper part of the surge tank 6 with pure ethylene, admitted through the valve 12 in batchwise manner as required. Due to the fact that the ethylene is less dense, the polymer-monomer mixture remains at the bottom of the surge tank 6 and pure monomer remains at the top, filling the pressure transducer 10. The surge tank 6 is preferably a long, small bore tube so that end-to-end mixing of polymer into the pure monomer at the top is minimized.

The preconditioned ethylene-polyethylene mixture is then passed through an upstream line 13 which is connected to the T-fitting 5 in the manner as illustrated in FIG. 1. The line 13 is, in turn, connected to a pneumatic valve 14 which has an intake stem 15 and an enlarged head 16. The valve 14 also includes a plate 17 having a diametrally reduced orifice 18 formed therein thereby forming a high pressure chamber 19 and a low pressure chamber 20. Connected to the low pressure chamber 20 is a downstream line 21 which is, in turn, connected to a polymer collecting tank 22. The pneumatic valve 14 also includes a movable plunger or so-called "valve stem" 23 having a manually set pneumatic positioner 24. By reference to FIGS. 2 and 3, it can be seen that the plunger is shiftable through the orifice 18 so that it is possible to vary the size of the orifice 18. For this purpose, the plunger 23 may be provided with an axial taper.

It is oftentimes desirable to regulate the quantity of gas which will pass through the orifice 18 since the pressure across the orifice 18 is a function of the flow rate and the flow rate is, in effect, determined by the content of polyethylene in the ethylene gas monomer. If the quantity of polyethylene contained in the monomer is small, then the flow rate would be substantially high so that it may be necessary to insert the plunger 23 partially in the orifice 18. On the other hand, if the polyethylene content in the monomer is high, the flow rate will be substantially reduced so that it will be desirable to open the orifice 18 to a greater degree. The plunger 23 also serves as a cleaning function in order to remove any polymer which may collect around the orifice 18.

Connected to the lower end of the polymer collecting tank 22 is a discharge line 25 which is provided with a control valve 26 for removal of the polyethylene polymer from the tank 22. A heating jacket 7 is concentrically disposed about the polymer collecting tank 22 to prevent the polyethylene from solidifying and hardening in the tank 22. Also connected to the upper end of the polymer collecting tank 22 communicating with the interior thereof is a header 28 which serves as a discharge port and connected thereto is an ethylene discharge line 29, the latter, in turn, being connected to a conventional rotameter 30. Also interposed in the discharge line 29 is a manually operable valve 31. The upper end of the rotameter 30 is vented to the atmosphere as illustrated in FIG. 1. Thus, when it is desired to control the flow rate of gas passing through the orifice 18, the position of the valve stem 23 can be regulated by observing the flow rate indicated by the rotameter 30.

OPERATION

In use, the throttling calorimeter A is connected to the effluent or discharge side of the polyethylene reactor. The system is filled with pure ethylene through the valve 12 and the control valve 3 is manually opened so that a charge of the polymer containing ethylene is passed into the preconditioned system. The throttling calorimeter may be operated on a continuous basis and the heat exchanger 4 is designed to raise the temperature of the inlet gas to the desired upstream temperature. Furthermore, the feedback control loop 8 will account for fluctuations in the pressure in the effluent from the polyethylene reactor and provide an upstream gas at a desired temperature and approximately at a 7800 p.s.i. pressure. Inasmuch as the polyethylene reactor does not convert 100% of the monomer to polymer, the effluent will contain a percentage of the polyethylene solution in the gaseous ethylene monomer. Next, the valve stem 23 of the pneumatic valve 14 is adjusted manually to provide a desired flow rate through the orifice 18 and this flow rate is indicated by the rotameter 30. Periodically, the valve 26 may be opened and the valve 31 may be manually closed for emptying the polymer collected in the polymer collecting tank 22.

The gas mixture which has been preconditioned, that is to say, that it has been reduced to a preselected temperature and pressure is passed through the orifice 18 in the pneumatic valve 14. The upstream and downstream temperatures are measured by thermocouples $T_1$ and $T_2$ respectively located in the upstream chamber 19 and downstream chamber 20 of the valve 14. As the mixture is passed through the orifice 18 in the valve 14 at a fixed temperature and pressure, the expansion of the gaseous monomer will cause a temperature change. The downstream temperature of the mixture will depend upon the proportions of the monomer and the polymer present. Through this method, it is possible to determine the amount of conversion of ethylene to polyethylene that occurred in the polyethylene reactor. Furthermore, the thermocouples $T_1$, $T_2$ are, in turn, connected to suitable temperature indicating or recording devices (not shown).

It is important to choose the corresponding pressure ratio between upstream and downstream conditions in relation to such factors as the temperature and pressure of the gas before expansion.

It is important to choose the upstream pressure, upstream temperature and downstream pressure such that different polymer concentrations in the fluid will result in substantially different easily measurable downstream temperatures. When a pure fluid flows through a throttle from a region of higher to finitely lower pressure, under conditions such that no heat is transferred to or from the fluid, that no work is obtained from the process, and no significant changes in kinetic or potential energy occur, the enthalpy of the fluid undergoing the process is the same upstream and downstream of the orifice. This process is frequently known in the literature as a "Joule-Thompson" expansion.

A pure fluid undergoing an isenthalpic or Joule-Thompson expansion may exhibit either a rise or a decrease or no change in temperature. Ideal gases do not change temperature, but real fluids generally do. The amount of change of temperature of real fluids depends on the upstream temperature and pressure and the downstream pressure. Many fluids including most gases exhibit temperature increases or decreases or no change in temperature under different combinations of conditions.

In general, different materials exhibit different temperature changes upon expansion through a throttle from a set upstream pressure and temperature to a set downstream pressure. When a mixture of two materials expands through a throttle, the downstream temperature is a function of the downstream temperatures for the two pure materials and of the relative proportions of the two materials. Usually, the temperature for a mixture is intermediate to the temperatures for the pure compounds.

Figure 2:
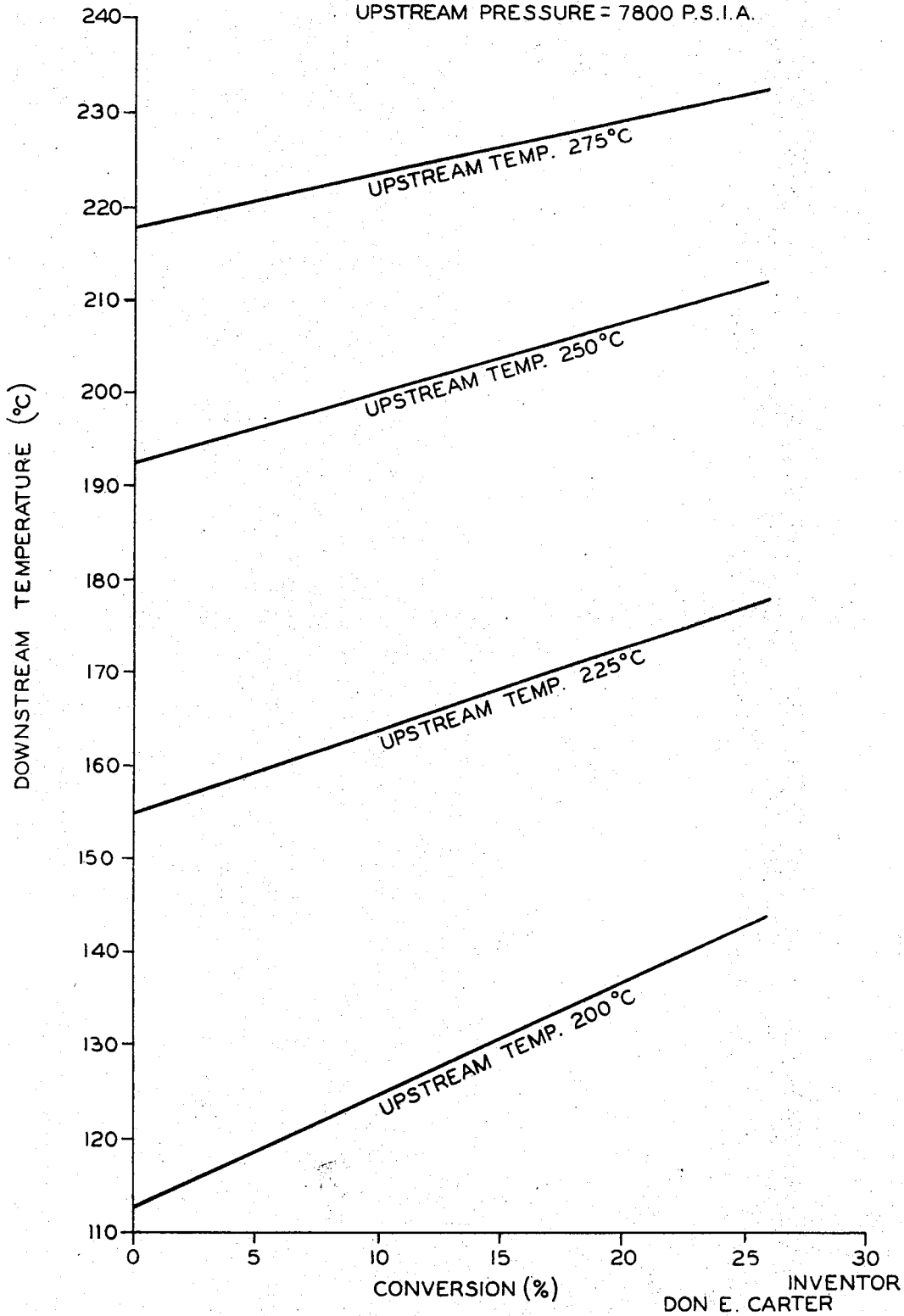
FIG. 2 is a temperature rise-conversion chart for indicating the percent of ethylene-polyethylene conversion which is used in connection with the present invention for determining the degree of conversion.

For easy accurate measurement of concentration, it is desirable that the differences in the relative concentrations of the two materials lead to easily measurable differences in downstream temperature. Proper conditions for this can usually be found by considering thermodynamic charts for the two pure materials. The case of ethylene and polyethylene may be considered, for example. A thermodynamic chart for ethylene has been published by Benzler and Von Koch[1] and charts for polyethylene have been published by Parks and Richards.[2] FIG. 2 is based upon an upstream pressure of 7800 p.s.i.a. and a downstream pressure of about 50 p.s.i.a. (Changes in downstream pressure in the range of 0–100 p.s.i.a. have little effect on results.) Upstream temperatures of 200, 225, 250 and 275° C. are considered. For pure ethylene, the references given above supply the following data:

|  | Temperature (° C.) | Pressure (p.s.i.a.) | Enthalpy (B.t.u./lb.) |
|---|---|---|---|
| Polyethylene | 200 | 7,800 | 314 |
|  | 226 | 50 | 314 |
| Ethylene | 200 | 7,800 | 360 |
|  | 114 | 50 | 360 |

When pure ethylene at 200° C. and 7800 p.s.i.a. undergoes isenthalpic expansion to 50 p.s.i.a., the temperature falls to about 114° C. In a similar situation, the temperature of pure polyethylene rises to about 226° C. If a mixture of the two is expanded, a generally intermediate temperature is reached. An estimate of the intermediate temperature can be obtained from the constant pressure heat capacity of the pure materials at the downstream pressure. From the Parks and Richards data, the specific heat of polyethylene at 50 p.s.i.a. in the range of 150°–200° C. is about 1.07 B.t.u./lb.-° C. From the Benzler and Von Koch data, the specific heat of ethylene at 50 p.s.i.a. in the range of 150°–200° C. is about 1.08 B.t.u./lb.-° C. For a mixture of, for example, 10 weight percent polyethylene and 90 weight percent ethylene, the downstream temperature T of the mixture is calculated from the following equation.

$$(0.9)(1.08)(T-114) \cong (0.1)(1.07)(226-T)$$
$$T \cong 125.5° C.$$

to be approximately 125.5° C. This is a substantial, easily measured difference in temperature from pure ethylene, which is known to be 114° C. Therefore, the upstream conditions of 7800 p.s.i. and 200° C. are favorable.

Calculations as the type above may be used to construct an approximate temperature versus conversion plot such as FIG. 2. However, the calculation does not support an exact conversion versus downstream temperature correlation because it ignores such thermodynamic factors as heats of mixing of polymer and monomer and differences in partial molal volumes of components in solution. Therefore, a chart constructed by the methods described above must be checked by tests on actual solutions and corrected, if necessary.

It should be recognized that if an equation of state for the fluids is available, the temperature changes for the components may be estimated by algebraic methods theoretically equivalent to the use of a graphical thermodynamic chart. It should also be recognized that as long as the downstream pressure is low, the exact level of downstream pressure will usually have little effect on downstream temperature because enthalpy is usually affected only slightly at low pressures.

In its preferred embodiment, the conversion meter A is operated at a fixed upstream pressure and temperature condition. However, the measurement of conversion is possible using varying upstream temperatures and/or pressures. In this case, data in the form of equations or a series of charts similar to FIG. 2 constructed from such equations are necessary to determine monomer conversion. In some cases, where stabilization of upstream conditions is difficult, it may be preferable to operate with variable upstream conditions and calculate conversion, perhaps with the aid of a computer.

Further, without exceeding the scope of the invention, it would be possible to operate the throttling colorimeter with addition to or withdrawal of a known amount of heat from the apparatus or by adding to or withdrawing a known amount of work from the process. In this case, the process would no longer be isenthalpic. However, the departure from an isenthalpic process could be calculated and with appropriate connection the degree of conversion could be determined.

The volume of the monomer constituents, namely ethylene, is a function of the pressure and the temperature and similarly, the volume of the polymer constituent, namely polyethylene. Accordingly, the quantity of the respective constituents of monomer and polymer present is a function of the pressure and temperature. Therefore, it can be seen that a change in temperature or a particular change in pressure is a function of the percentage of polymer to monomer, and in this case, indicates percentage of polymer to monomer in the effluent or degree of conversion obtained in the reactor. The thermodynamic chart of FIG. 2 is a plot of the degree of conversion as a function of temperature change for given downstream temperatures. In essence, FIG. 2 is really a chart showing the percent of conversion to polyethylene as a function of the downstream expansion temperature $T_2$ for four given upstream temperature conditions. The temperature conditions indicated are $T_1$ at 200° C., 225° C., 250° C. and 275° C. This chart was prepared on the basis of an upstream pressure at 7800 p.s.i. absolute pressure. It should be obvious, that many charts of this type could be prepared for various desired upstream pressure conditions. In the case of the present invention, the preconditioning system 1 will generally be designed to maintain a 7800 p.s.i. absolute upstream pressure. The expansion is generally performed through the orifice 18 so that the various upstream temperature conditions as indicated above are achieved in the expansion. Accordingly, the downstream temperature $T_2$ is then a function of the degree of conversion, as indicated in FIG. 2. Thus, if at 7800 p.s.i. absolute upstream pressure, and at an upstream temperature condition of 225° C. a downstream temperature $T_2$ 160° was measured on the thermocouples $T_2$, ---
[1] H. Benzler and A. von Koch, Chem. Ing. Tech., 27, 71 (1955).
[2] W. Parks and R. B. Richards, Trans. Far. Soc., 45, 203 (1949).

then according, to FIG. 2, a 9% conversion of ethylene to polyethylene would have been obtained.

It should also be understood that the above device will operate with any monomer-polymer conversion system. However, the device and the method of the present invention are most suitable for indicating conversion when the monomer is maintained in a gaseous state at high pressure and acts as a solute for the polymer so that the polymer is, in effect, dissolved in the monomer. Oftentimes, a propane modifier is contained within the reactor feed. The propane modifier included in the charge to the throttling calorimeter would not affect the results thus obtained when computing the degree of conversion. However, it would change the amount of conversion by a constant factor and this factor can be determined experimentally and included when constructing the conversion charts.

The invention is further illustrated by, but not limited to, the following example.

EXAMPLE

A throttling calorimeter substantially similar to the device of FIG. 1 was constructed and the valve 3 employed was an autoclave valve. The inlet line had a length of 5 feet and an inner diameter of 3/16 inch. The pressure control then employed was a Manning, Maxwell and Moore Microsen controller and the pressure transducer employed was a Baldwin-Lima-Hamilton SR–4 transducer. The surge tank 6 had a length of two feet and an inner diameter of 5/16 inch. The polymer collecting tank was rated at 3,000 p.s.i. pressure and the discharge line had a diameter of 5/16 inner inch and an Aminco "Little Richard" pneumatic valve. The valve 14 employed was an "Aminco Meter-mo" pneumatic valve. The stem 15 of the valve 14 had an inner diameter of 5/16 inch.

The ethylene polymerization reactor, the reactor and the throttling calorimeter are purged of air by opening the various valves in the system. Ethylene is then passed into the system for approximately five minutes for purging thereof. After the ethylene reactor had been operating for approximately one-half hour, a sample flow is withdrawn therefrom and admitted to the throttling calorimeter. The valve 3 is set to maintain a 7800 p.s.i. upstream pressure. The downstream pressure is 0–100 p.s.i.g. The heat exchanger 4 is designed to maintain an upstream temperature of the gas at 225° C. A number of downstream temperature conditions are measured by the thermocouple $T_2$ and the degree of conversion is determined by the chart of FIG. 2.

It should be understood that changes and modifications can be made in the form, construction, arrangement and combination of parts presently described and pointed out without departing from the nature and principle of my invention.

Having thus described my invention, what I desire to claim and secure by Letters Patent is:

1. The method of measuring the amount of a solid in admixture with a gas which is maintained above its critical temperature and critical pressure to prevent condensation thereof, said method comprising maintaining the upstream temperature and upstream pressure of the gas-solid mixture, passing the gas-solid mixture having said maintained upstream pressure and temperature through an orifice under isenthalpic conditions into a region of lower downstream pressure causing an upstream-downstream temperature differential, the ratio of upstream pressure to downstream pressure being such that the downstream pressure has little effect on the downstream temperature, measuring the downstream temperature and establishing the amount of solid present as a function of the upstram-downstream temperature differential for a given pressure differential.

2. The method of claim 1 further characterized in that the solid is a solute which is dissolved in the gas which serves as a solvent.

3. The method of claim 1 further characterized in that the method is that of measuring the degree of conversion of monomer and polymer in a polymer producing process, wherein the gas is a monomer and is maintained in a nonideal gas state condition.

4. The method of measuring the degree of conversion of monomer to polymer wherein the polymer is a solid and the monomer is a gas which is maintained above its critical temperature and critical pressure to prevent condensation thereof, said method comprising maintaining the upstream pressure and upstream temperature of said polymer-monomer mixture, passing the polymer-monomer mixture having said maintained upstream pressure and temperature through an orifice under isenthalpic conditions into a region of lower downstream pressure causing an upstream-downstream temperature differential, the ratio of upstream pressure to downstream pressure is such that the downstream pressure has relatively little effect on the downstream temperature, measuring the downstream temperature, establishing a curve characteristic of percent of one of the components present in the mixture as a function of the upstream-downstream temperature differential for a given pressure differential, and determining the percent of said last-named component present from said curve with the temperature differential thus measured.

5. The method of measuring the amount of a solid in admixture with a gas which is maintained above its critical temperature and critical pressure to prevent condensation thereof, said method comprising maintaining the upstream temperature and upstream pressure of the gas-solid mixture, passing the gas-solid mixture having said maintained upstream pressure of 7800 p.s.i.a. and temperature within the range of 200° C. to 275° C. through an orifice under isenthalpic conditions into a region of lower downstream pressure causing an upstream-downstream temperature differential, the ratio of upstream pressure to downstream pressure is such that the downstream pressure has relatively little effect on the downstream temperature, measuring the downstream temperature, and establishing the amount of solid present as a function of the upstream-downstream temperature differential for a given pressure differential.

6. The method of measuring the amount of polyethylene in admixture with ethylene which is maintained above its critical temperature and critical pressure to prevent condensation thereof, said method comprising maintaining the upstream temperature and upstream pressure of said polyethylene-ethylene mixture, passing the polyethylene-ethylene mixture having said maintained upstream pressure and temperature through an orifice under isenthalpic conditions into a region of lower downstream pressure causing an upstream-downstream temperature differential, the ratio of upstream pressure to downstream pressure is such that the downstream pressure has relatively little effect on the downstream temperature, measuring the downstream temperature and establishing the amount of polyethylene present as a function of the upstream-downstream temperature differential for a given pressure differential.

7. The method of measuring the degree of conversion of monomer to polymer wherein the polymer is a solid and the monomer is a gas which is maintained above its critical temperature and critical pressure to prevent condensation thereof, said method comprising maintaining the upstream pressure and upstream temperature of said polymer-monomer mixture, passing the polymer-monomer mixture having said maintained upstream pressure and temperature through an orifice under isenthalpic conditions into a region of lower downstream pressure causing an upstream-downstream temperature differential, the ratio of upstream pressure to downstream pressure is such that the downstream pressure has relatively little effect on the downstream temperature, measuring the downstream temperature, establishing the amount of polymer present as a function of the upstream-downstream temperature differential for a given pressure differential, and passing the mixture from the region of lower downstream pressure after expansion thereof into a separation environment for separating the monomer from the polymer.

8. A device for quantitatively measuring the degree of monomer to polymer conversion in a polymer producing system, and where the monomer is a gas which is maintained above its critica temperature and its critical pressure; said device comprising a housing, means in said housing dividing the interior thereof into upstream and downstream chambers, an inlet port for introducing a polymer-monomer mixture into said upstream chamber, an outlet port in said downstream chamber for removing the polymer-monomer mixture therefrom, means for maintaining the upstream mixture at a relatively fixed pressure, means for measuring the upstream temperature of said mixture, means defining an orifice between said chambers permitting said mixture to pass from said upstream chamber to said downstream chamber under isenthalpic conditions and in such manner that the ratio of the upstream pressure to downstream pressure is such that the downstream pressure has relatively little effect on the downstream temperature, and means operatively associated with said housing to measure the downstream temperature of said mixture after expansion thereof under isenthalpic conditions through said orifice.

9. The device of claim 8 further characterized in that means is operatively associated with said housing for selectively varying the size of the orifice for accommodating mixtures of different solid content.

10. A device for quantitatively measuring the amount of solid in admixture with a gas which is above its critical temperature and critical pressure, said device comprising a housing, means in said housing dividing the interior thereof into upstream and downstream chambers, an inlet port for introducing the gas-solid mixture into said upstream chamber, an outlet port in said downstream chamber for removing the mixture therefrom, means for maintaining the upstream mixture at a relatively fixed pressure, means for measuring the upstream temperature of said mixture, means defining an orifice between said chambers permitting said mixture to pass from said upstream chamber to said downstream chamber under isenthalpic conditions and in such manner that the ratio of the upstream pressure to downstream pressure is such that the downstream pressure has relatively little effect on the downstream temperature, and means operatively associated with said housing to measure the downstream temperature of said mixture after expansion thereof through said orifice.

11. A device for quantitatively measuring the degree of monomer to polymer conversion in a polymer producing system, said device comprising a housing, means in said housing dividing the interior thereof into upstream and downstream chambers, an inlet port for introducing a polymer-monomer mixture into said upstream chamber, an outlet port in said downstream chamber for removing the polymer-monomer mixture therefrom, means for maintaining the upstream mixture at a relatively fixed pressure, means for measuring the upstream temperature of said mixture, means defining an orifice between said chambers permitting said mixture to pass from said upstream chamber to said downstream chamber under isenthalpic conditions and in such manner that the ratio of the upstream pressure to downstream pressure is such that the downstream pressure has relatively little effect on the downstream temperature, means operatively associated with said housing to measure the downstream temperature of said mixture after expansion thereof through said orifice, and a monomer-polymer separation tank operatively connected to said outlet port in said downstream chamber for separating monomer and polymer.

12. A device for quantitatively measuring the degree of monomer to polymer conversion in a polymer producing system, said device comprising a housing, means in said housing dividing the interior thereof into upstream and downstream chambers, an inlet port for introducing polymer-monomer mixture into said upstream chamber, an outlet port in said downstream chamber for removing the polymer-monomer mixture therefrom, an inlet line connected to said inlet port, heat exchange means operatively associated with said line, pressure control means operatively associated with said line, said pressure control means including a control valve and a pressure controller connected to said valve in feedback relationship for preconditioning the polymer-monomer mixture to a desired upstream pressure prior to admission into said upstream chamber, means for measuring the upstream temperature of said mixture, means defining an orifice between said chambers permitting said mixture to pass from said upstream chamber to said downstream chamber under isenthalpic conditions and in such manner that the ratio of the upstream pressure to downstream pressure is such that the downstream pressure has relatively little effect on the downstream temperature, and means operatively associated with said housing to measure the downstream temperature of said mixture after expansion thereof.

13. A device for quantitatively measuring the degree of ethylene to polyethylene conversion in a polyethylene producing system, said device comprising a housing, means in said housing dividing the interior thereof into upstream and downstream chambers, an inlet port for introducing an ethylene-polyethylene mixture into said upstream chamber, an outlet port in said downstream chamber for removing the mixture therefrom, means for maintaining the upstream mixture at a relatively fixed pressure, means for measuring the upstream temperature of said mixture, means defining an orifice between said chambers permitting said mixture to pass from said upstream chamber to said downstream chamber under isenthalpic conditions and in such manner that the ratio of the upstream pressure to downstream pressure is such that the downstream pressure has relatively little effect on the downstream temperature, and means operatively associated with said housing to measure the downstream temperature of said mixture after expansion thereof through said orifice.

References Cited

UNITED STATES PATENTS

| | | | |
|---|---|---|---|
| 3,221,541 | 12/1965 | Osborne | 73—28 X |
| 3,354,052 | 11/1967 | Williams | 73—53 X |
| 2,926,521 | 3/1960 | Booth | 73—29 |
| 3,264,862 | 8/1966 | Felton | 73—25 |

FOREIGN PATENTS 675,013    11/1964    Italy.

CHARLES A. RUEHL, Primary Examiner

U.S. Cl. X.R.

73—25, 190